US012750106B2

(12) United States Patent
Zhang et al.

(10) Patent No.: US 12,750,106 B2
(45) Date of Patent: Sep. 29, 2026

(54) METHODS, APPARATUS AND SYSTEMS FOR CHANNEL STATE INFORMATION MEASUREMENT AND REPORT

(71) Applicant: ZTE CORPORATION, Shenzhen (CN)

(72) Inventors: Chenchen Zhang, Shenzhen (CN); Wei Gou, Shenzhen (CN); Junfeng Zhang, Shenzhen (CN); Peng Hao, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 366 days.

(21) Appl. No.: 18/221,491

(22) Filed: Jul. 13, 2023

(65) Prior Publication Data

US 2023/0379026 A1 Nov. 23, 2023

Related U.S. Application Data

(63) Continuation of application No. PCT/CN2021/072070, filed on Jan. 15, 2021.

(51) Int. Cl.

*H04B 7/06* (2006.01)
*H04L 1/08* (2006.01)

(Continued)

(52) U.S. Cl.

CPC ......... *H04B 7/0626* (2013.01); *H04B 7/0632* (2013.01); *H04L 1/08* (2013.01); *H04W 24/10* (2013.01); *H04L 5/0007* (2013.01)

(58) Field of Classification Search

CPC ....... H04B 7/0626; H04B 7/0632; H04L 1/08; H04L 5/0007; H04W 24/10

See application file for complete search history.

(56) References Cited

U.S. PATENT DOCUMENTS

2020/0106549 A1 4/2020 Bagheri et al.
2020/0107319 A1* 4/2020 Bagheri ................ H04W 72/23

(Continued)

FOREIGN PATENT DOCUMENTS

CN 105122680 12/2015
CN 107210794 9/2017

(Continued)

OTHER PUBLICATIONS

Extended European Search Report dated Feb. 6, 2024 from European Application No. 21 91 8536 (8 pages).

(Continued)

*Primary Examiner* — Brian P Cox

(74) *Attorney, Agent, or Firm* — Crowell & Moring LLP

(57) ABSTRACT

Methods, apparatus and systems for channel state information measurement and report in a wireless communication are disclosed. In one embodiment, a method performed by a wireless communication device is disclosed. The method comprises: receiving, from a wireless communication node, a configuration associated with a channel state information (CSI) report; determining a CSI report type based on the configuration; performing, according to the CSI report type, a measurement based on at least one of: an interference measurement resource (IMR), a channel measurement resource (CMR), or a transport block transmitted in a physical downlink shared channel (PDSCH) from the wireless communication node; generating the CSI report based on the measurement; and transmitting the CSI report to the wireless communication node.

18 Claims, 5 Drawing Sheets

(51) Int. Cl.
*H04L 5/00* (2006.01)
*H04W 24/10* (2009.01)

(56) References Cited

U.S. PATENT DOCUMENTS

| | | | | |
|---|---|---|---|---|
| 2021/0075486 | A1 * | 3/2021 | Song | H04W 72/0446 |
| 2021/0258118 | A1 * | 8/2021 | Bae | H04W 24/10 |
| 2022/0345268 | A1 * | 10/2022 | Matsumura | H04L 1/0013 |

FOREIGN PATENT DOCUMENTS

| | | | |
|---|---|---|---|
| CN | 111386661 | | 7/2020 |
| CN | 111566983 | | 8/2020 |
| EP | 2 763 480 | A1 | 8/2014 |
| EP | 2 869 519 | A1 | 5/2015 |
| WO | WO2020/091536 | | 5/2020 |

OTHER PUBLICATIONS

International Search Report issued Oct. 11, 2021 in International (PCT) Application No. PCT/CN2021/072070.

* cited by examiner

METHODS, APPARATUS AND SYSTEMS FOR CHANNEL STATE INFORMATION MEASUREMENT AND REPORT

This application is a continuation application of PCT International Application No. PCT/CN2021/072070, filed with the China National Intellectual Property Administration, PRC on Jan. 15, 2021, which is herein incorporated by reference in its entirety.

TECHNICAL FIELD

The disclosure relates generally to wireless communications and, more particularly, to methods, apparatus and systems for channel state information measurement and report in a wireless communication.

BACKGROUND

A fifth-generation (5G) new radio (NR) network will support Ultra-Reliable and Low Latency Communications (URLLC) applications such as smart vehicle control, drone control, robotic surgery and MTC applications like industry automation, etc. that require new solutions to address the demands for lower latency. Considering the low delay and high reliability of the URLLC service, a terminal, or a user equipment (UE), needs to feed back more accurate and more timely channel state information (CSI) to the base station, such that the base station can perform more reasonable link self-adaptation to ensure the URLLC service requirements.

The CSI feedback may include some statistical information, such as average and variance of channel quality information (CQI). To obtain the statistical information, the UE needs to perform measurement for multiple CSI-RS occasions so as to obtain multiple observation samples for calculating the statistical information. The CSI may also be obtained in accordance with a decoding status of a physical downlink shared channel (PDSCH). In that case, the UE needs to calculate the CSI based on the PDSCH reception. But there is no existing solution on how a UE can measure more accurate channel status information based on downlink signals or channels, in view of the statistical information calculation and other 5G requirements.

SUMMARY OF THE INVENTION

The exemplary embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, exemplary systems, methods, devices and computer program products are disclosed herein. It is understood, however, that these embodiments are presented by way of example and not limitation, and it will be apparent to those of ordinary skill in the art who read the present disclosure that various modifications to the disclosed embodiments can be made while remaining within the scope of the present disclosure.

In one embodiment, a method performed by a wireless communication device is disclosed. The method comprises: receiving, from a wireless communication node, a configuration associated with a channel state information (CSI) report; determining a CSI report type based on the configuration; performing, according to the CSI report type, a measurement based on at least one of: an interference measurement resource (IMR), a channel measurement resource (CMR), or a transport block transmitted in a physical downlink shared channel (PDSCH) from the wireless communication node; generating the CSI report based on the measurement; and transmitting the CSI report to the wireless communication node.

In another embodiment, a method performed by a wireless communication node is disclosed. The method comprises: transmitting, to a wireless communication device, a configuration associated with a channel state information (CSI) report; and receiving the CSI report from the wireless communication device. The configuration indicates a CSI report type. The CSI report is generated based on a measurement that is performed according to the CSI report type based on at least one of: an interference measurement resource (IMR), a channel measurement resource (CMR), or a transport block transmitted in a physical downlink shared channel (PDSCH) from the wireless communication node.

In a different embodiment, a wireless communication node configured to carry out a disclosed method in some embodiment is disclosed. In yet another embodiment, a wireless communication device configured to carry out a disclosed method in some embodiment is disclosed. In still another embodiment, a non-transitory computer-readable medium having stored thereon computer-executable instructions for carrying out a disclosed method in some embodiment is disclosed.

BRIEF DESCRIPTION OF THE DRAWINGS

Various exemplary embodiments of the present disclosure are described in detail below with reference to the following Figures. The drawings are provided for purposes of illustration only and merely depict exemplary embodiments of the present disclosure to facilitate the reader's understanding of the present disclosure. Therefore, the drawings should not be considered limiting of the breadth, scope, or applicability of the present disclosure. It should be noted that for clarity and ease of illustration these drawings are not necessarily drawn to scale.

DETAILED DESCRIPTION OF EXEMPLARY EMBODIMENTS

Figure 1:
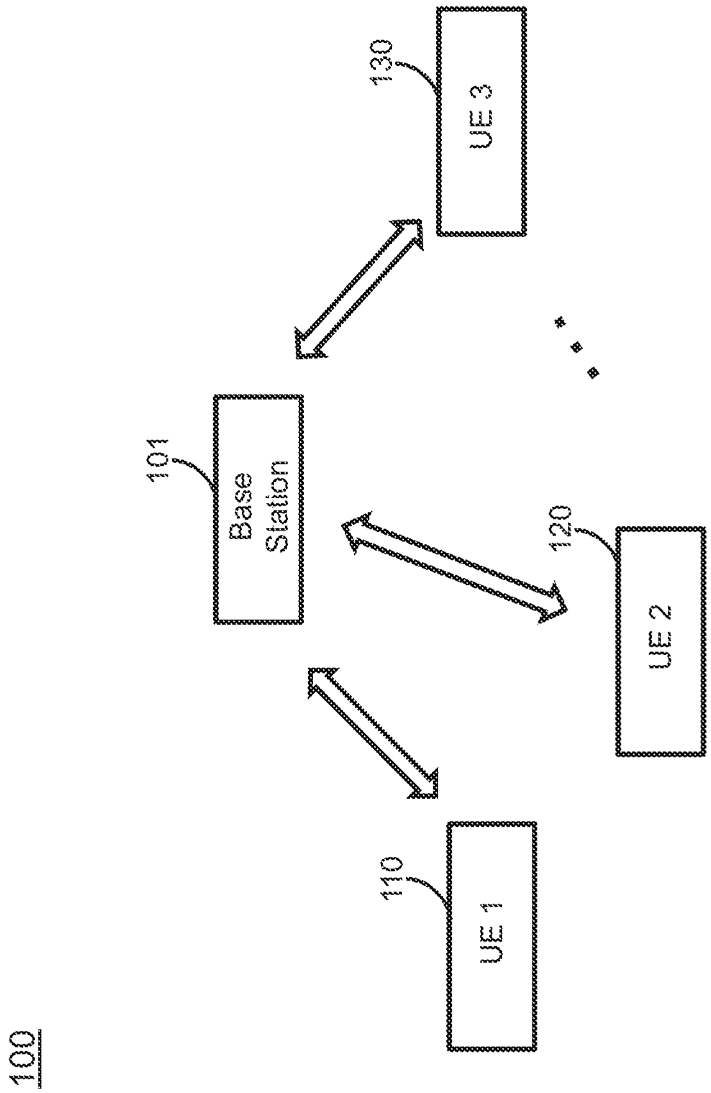
FIG. 1 illustrates an exemplary communication network in which techniques disclosed herein may be implemented, in accordance with an embodiment of the present disclosure.

Various exemplary embodiments of the present disclosure are described below with reference to the accompanying figures to enable a person of ordinary skill in the art to make and use the present disclosure. As would be apparent to those of ordinary skill in the art, after reading the present disclosure, various changes or modifications to the examples described herein can be made without departing from the scope of the present disclosure. Thus, the present disclosure is not limited to the exemplary embodiments and applications described and illustrated herein. Additionally, the specific order and/or hierarchy of steps in the methods disclosed herein are merely exemplary approaches. Based upon design preferences, the specific order or hierarchy of steps of the disclosed methods or processes can be re-arranged while remaining within the scope of the present disclosure. Thus, those of ordinary skill in the art will understand that the methods and techniques disclosed herein present various steps or acts in a sample order, and the present disclosure is not limited to the specific order or hierarchy presented unless expressly stated otherwise.

A typical wireless communication network includes one or more base stations (typically known as a "BS") that each provides geographical radio coverage, and one or more wireless user equipment devices (typically known as a "UE") that can transmit and receive data within the radio coverage. In the wireless communication network, a BS and a UE can communicate with each other via a communication link, e.g., via a downlink (DL) radio frame from the BS to the UE or via an uplink (UL) radio frame from the UE to the BS.

In a current new radio (NR) standard, the feedback of aperiodic channel state information (CSI) can only be triggered by the physical downlink control channel (PDCCH) carrying UL Grant, and is sent in the physical uplink shared channel (PUSCH) scheduled by the UL Grant. In this mode, if there is no UL shared channel (SCH) to be sent, the BS will have to send the PDCCH carrying UL Grant to trigger the aperiodic channel state feedback. This may cause the PDCCH to be blocked. One solution is that the PDCCH carrying the DL Grant can trigger the feedback of the aperiodic channel state information, and the DL Grant can schedule the physical downlink shared channel (PDSCH) at the same time. Thus, the triggering of aperiodic channel state information feedback is enhanced. When the BS has PUSCH to be scheduled and the terminal needs to feed back the channel state information, the UL Grant can trigger the aperiodic channel state information feedback. When the BS has PDSCH to be scheduled and the terminal needs to feed back the channel state information, the DL Grant can trigger the aperiodic channel state information feedback.

The present disclosure provides methods and systems for a UE to measure CSI based on determined measurement resources and/or other configurations, and transmit a CSI report as a feedback to the BS on the CSI feedback resources expected by the BS. When the resources for PDSCH and CSI measurement are overlapped, the UE can perform CSI measurement without affecting PDSCH reception through rate matching.

The methods disclosed in the present teaching can be implemented in a wireless communication network, where a BS and a UE can communicate with each other via a communication link, e.g., via a downlink radio frame from the BS to the UE or via an uplink radio frame from the UE to the BS. In various embodiments, a BS in the present disclosure can be referred to as a network side and can include, or be implemented as, a next Generation Node B (gNB), an E-UTRAN Node B (eNB), a Transmission/Reception Point (TRP), an Access Point (AP), an AP MLD, a non-terrestrial reception point for satellite/fire balloon/unmanned aerial vehicle (UAV) communication, a radio transceiver in a vehicle of a vehicle-to-vehicle (V2V) wireless network, etc.; while a UE in the present disclosure can be referred to as a terminal and can include, or be implemented as, a mobile station (MS), a station (STA), a non-AP MLD, a terrestrial device for satellite/fire balloon/unmanned aerial vehicle (UAV) communication, a radio transceiver in a vehicle of a vehicle-to-vehicle (V2V) wireless network, etc.

In various embodiments of the present teaching, the two ends of a communication, e.g., a BS and a UE, may be described herein as non-limiting examples of "wireless communication node," and "wireless communication device" respectively, which can practice the methods disclosed herein and may be capable of wireless and/or wired communications, in accordance with various embodiments of the present disclosure.

FIG. 1 illustrates an exemplary communication network 100 in which techniques disclosed herein may be implemented, in accordance with an embodiment of the present disclosure. As shown in FIG. 1, the exemplary communication network 100 includes a base station (BS) 101 and a plurality of UEs, UE 1 110, UE 2 120 . . . UE 3 130, where the BS 101 can communicate with the UEs according to wireless protocols. To ensure transmission reliability, the BS 101 needs to perform link adaptation based on channel quality feedback from the UEs. In an application of URLLC service, it is desirable to have this channel quality feedback (e.g. CSI feedback) sent by each UE in a timely and accurate manner.

Figure 2:
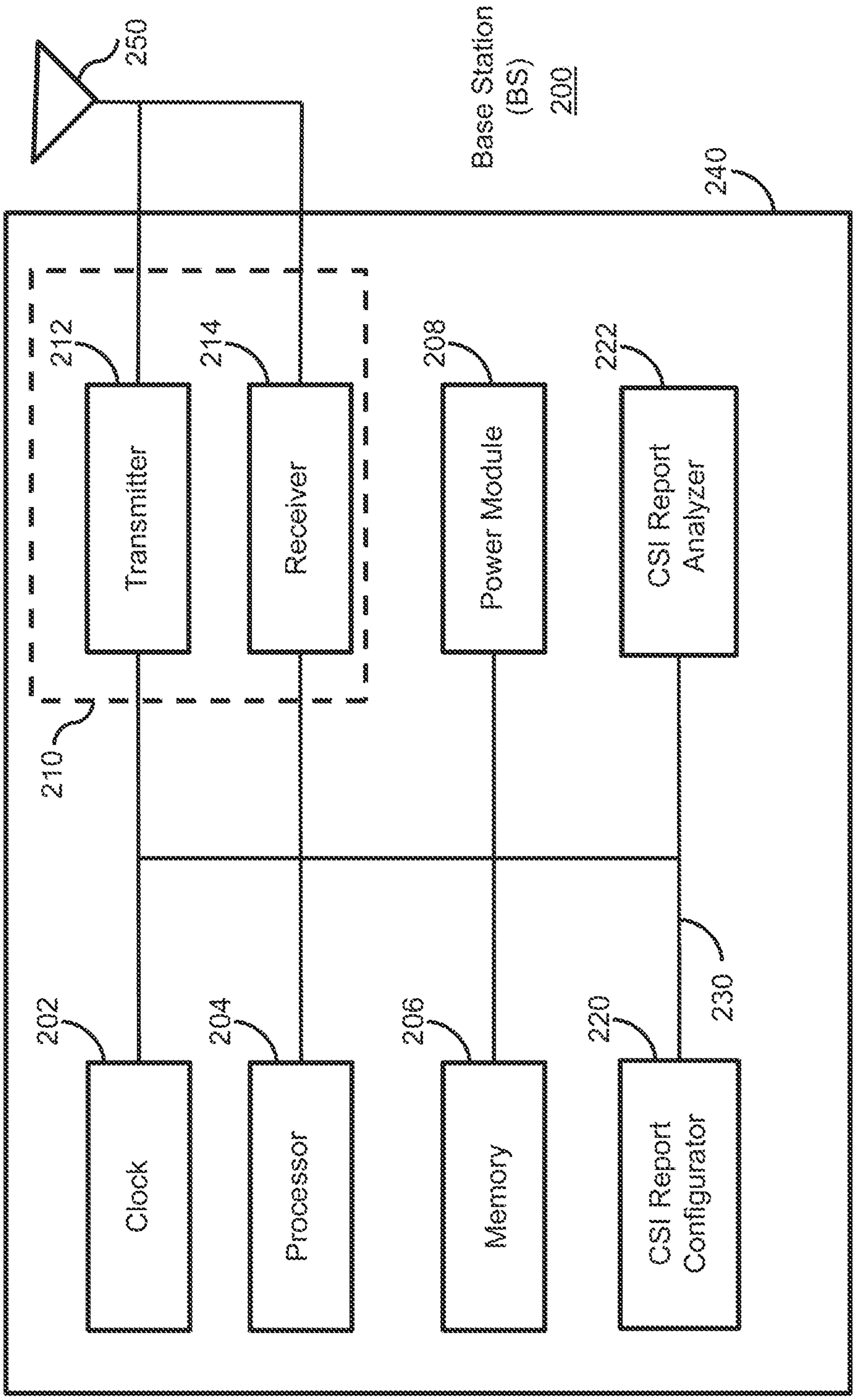
FIG. 2 illustrates a block diagram of a base station (BS), in accordance with some embodiments of the present disclosure.

FIG. 2 illustrates a block diagram of a base station (BS) 200, in accordance with some embodiments of the present disclosure. The BS 200 is an example of a node or device that can be configured to implement the various methods described herein. As shown in FIG. 2, the BS 200 includes a housing 240 containing a system clock 202, a processor 204, a memory 206, a transceiver 210 comprising a transmitter 212 and receiver 214, a power module 208, a CSI report configurator 220, and a CSI report analyzer 222.

In this embodiment, the system clock 202 provides the timing signals to the processor 204 for controlling the timing of all operations of the BS 200. The processor 204 controls the general operation of the BS 200 and can include one or more processing circuits or modules such as a central processing unit (CPU) and/or any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable circuits, devices and/or structures that can perform calculations or other manipulations of data.

The memory 206, which can include both read-only memory (ROM) and random access memory (RAM), can provide instructions and data to the processor 204. A portion of the memory 206 can also include non-volatile random access memory (NVRAM). The processor 204 typically performs logical and arithmetic operations based on program instructions stored within the memory 206. The instructions (a.k.a., software) stored in the memory 206 can be executed by the processor 204 to perform the methods described herein. The processor 204 and memory 206 together form a processing system that stores and executes software. As used herein, "software" means any type of instructions, whether referred to as software, firmware, middleware, microcode, etc., which can configure a machine or device to perform one or more desired functions or processes. Instructions can include code (e.g., in source code format, binary code format, executable code format, or any other suitable format of code). The instructions, when executed by the one or more processors, cause the processing system to perform the various functions described herein.

The transceiver 210, which includes the transmitter 212 and receiver 214, allows the BS 200 to transmit and receive data to and from a remote device (e.g., a UE or another BS). An antenna 250 is typically attached to the housing 240 and electrically coupled to the transceiver 210. In various embodiments, the BS 200 includes (not shown) multiple transmitters, multiple receivers, and multiple transceivers. In one embodiment, the antenna 250 is replaced with a multi-antenna array 250 that can form a plurality of beams each of which points in a distinct direction. The transmitter 212 can be configured to wirelessly transmit packets having different packet types or functions, such packets being generated by the processor 204. Similarly, the receiver 214 is configured to receive packets having different packet types or functions, and the processor 204 is configured to process packets of a plurality of different packet types. For example, the processor 204 can be configured to determine the type of packet and to process the packet and/or fields of the packet accordingly.

In a wireless communication, the CSI report configurator 220 in the BS 200 can generate a configuration associated with a channel state information (CSI) report for a UE. The CSI report configurator 220 can transmit, via the transmitter 212, the configuration to the UE. In some embodiments, the configuration can indicate a CSI report type.

The CSI report analyzer 222 in this example can receive, via the receiver 214, the CSI report from the UE. In some embodiments, the CSI report is generated based on a measurement that is performed according to the CSI report type based on at least one of: an interference measurement resource (IMR), a channel measurement resource (CMR), or a transport block transmitted in a physical downlink shared channel (PDSCH) from the BS 200.

In some embodiments, the CSI report type indicates a first type when the configuration contains no configuration information related to IMR or CMR associated with the CSI report. The measurement is performed based on a transport block transmitted in PDSCH associated with the CSI report, when configuration contains no configuration information related to IMR or CMR associated with the CSI report.

In some embodiments, the BS 200 transmits, via the transmitter 212, a plurality of PDSCH repetitions associated with the CSI report to the UE. The UE generates the CSI report based on a PDSCH repetition among the plurality of PDSCH repetitions. The PDSCH repetition may be determined based on at least one of: the first time PDSCH repetition among the plurality of PDSCH repetitions based on a system pre-definition, the last time PDSCH repetition among the plurality of PDSCH repetitions based on a system pre-definition, a sub-signaling in the configuration semi-statically transmitted through radio resource control (RRC) signaling, or a triggering status indication dynamically indicated by a downlink (DL) grant or uplink (UL) grant triggering the CSI report.

In some embodiments, after receiving the plurality of PDSCH repetitions associated with the CSI report, the UE generates the CSI report based on a combination of some or all PDSCH repetitions among the plurality of PDSCH repetitions. The some or all PDSCH repetitions may be determined based on at least one of: some of the plurality of PDSCH repetitions based on a system pre-definition, some of the plurality of PDSCH repetitions indicated by a sub-signaling in the configuration semi-statically transmitted through radio resource control (RRC) signaling, some of the plurality of PDSCH repetitions dynamically indicated in a triggering status indication by a DL grant or UL grant triggering the CSI report, all of the plurality of PDSCH repetitions based on a system pre-definition, all of the plurality of PDSCH repetitions indicated by a sub-signaling in the configuration semi-statically transmitted through RRC signaling, or all of the plurality of PDSCH repetitions dynamically indicated in a triggering status indication by a DL grant or UL grant triggering the CSI report.

In some embodiments, the CSI report type indicates a second type when the configuration contains configuration information related to IMR and/or CMR associated with the CSI report. The measurement is performed based on the IMR and/or CMR transmitted to the UE, when the configuration contains configuration information related to IMR and/or CMR associated with the CSI report. In some embodiments, the UE may perform the measurement based on at least one of: determining a starting occasion related to IMR and/or CMR associated with the CSI report; determining an ending occasion related to the IMR and/or CMR; or measuring CSI based on: the starting occasion, the ending occasion, and each IMR and/or CMR occasion between the starting occasion and the ending occasion.

In some embodiments, the starting occasion is determined based on at least one of: a slot or sub-slot in which a DL grant or UL grant triggering the CSI report is transmitted to the UE; a slot or sub-slot where the DL grant or UL grant is located, when an end symbol of the DL grant or UL grant is not later than a predetermined time position; a next slot or sub-slot where the DL grant or UL grant is located, when the end symbol of the DL grant or UL grant is later than the predetermined time position, wherein the predetermined time position is determined based on a semi-static configuration by the BS 200 or based on a system pre-definition; or a next available slot or sub-slot where the DL grant or UL grant is located, when the end symbol of the DL grant or UL grant is later than the predetermined time position, wherein the predetermined time position is determined based on a semi-static configuration by the BS 200 or based on a system pre-definition. The next available slot or sub-slot may be used for downlink transmissions, and is not necessarily an uplink slot or sub-slot.

In some embodiments, the ending occasion is determined based on a last IMR and/or CMR occasion that is not later than a reference resource of the CSI report triggered by the DL grant or UL grant, according to a time domain configuration of the IMR and/or CMR. The reference resource of the CSI report is determined as n time units before a first orthogonal frequency-division multiplexing (OFDM) symbol of transmitting the CSI report. Each of the n time units is one of: an OFDM symbol, a sub-slot or a slot; where n is an integer determined based on: a semi-static configuration by the BS 200, a system pre-definition, and/or a capability of the UE.

In some embodiments, the configuration indicates the UE to include statistical information of CSI in the CSI report. The statistical information may be calculated for the CSI report when the measurement is performed under at least one of the following conditions. According to a first condition, the measurement is performed for at least N IMR and/or CMR occasions, wherein N is a positive integer determined based on a semi-static configuration by the BS 200 or based on a system pre-definition. According to a second condition, the measurement is performed within a monitoring window having a length of at least M time units, wherein M is a positive integer determined based on a semi-static configuration by the BS 200 or based on a system pre-definition. Each of the M time units is one of: an OFDM symbol, a sub-slot or a slot.

In some embodiments, the configuration indicates the UE to include statistical information of CSI in the CSI report. But the UE may generate the CSI report without the statistical information or cancel the CSI report, when the CSI measurement is performed without satisfying at least one of the following conditions. According to a first condition, the measurement is performed for at least N IMR and/or CMR occasions, wherein N is a positive integer determined based on a semi-static configuration by the BS 200 or based on a system pre-definition. According to a second condition, the measurement is performed within a monitoring window having a length of at least M time units, wherein M is a positive integer determined based on a semi-static configuration by the BS 200 or based on a system pre-definition. Each of the M time units is one of: an OFDM symbol, a sub-slot or a slot.

In some embodiments, the configuration indicates an ending occasion related to the IMR and/or CMR. The CSI report analyzer 222 may receive the CSI report on a physical uplink control channel (PUCCH) resource at a time position from the UE. While the ending occasion related to the IMR and/or CMR is located at a first time unit, the time position may be another first time unit that is later than the first time unit by N second time units. Each first time unit is one of: an OFDM symbol, a sub-slot or a slot; and each second time unit is one of: an OFDM symbol, a sub-slot or a slot, where N is an integer determined based on: a semi-static configuration by the BS 200, a system pre-definition, and/or a capability of the UE. For example, while the ending occasion related to the IMR and/or CMR is located at the second OFDM symbol of a first slot, the time position may be the second OFDM symbol of a third slot, which is later than the second OFDM symbol of the first slot by two slots.

In some embodiments, the configuration indicates an ending position of a monitoring window of the measurement of the IMR and/or CMR. The CSI report analyzer 222 may receive the CSI report on a physical uplink control channel (PUCCH) resource at a time position from the UE. The time position may be determined to be a first time unit that is later than the ending position by N second time units. The first time unit is one of: an OFDM symbol, a sub-slot or a slot; and each second time unit is one of: an OFDM symbol, a sub-slot or a slot, where N is an integer determined based on: a semi-static configuration by the BS 200, a system pre-definition, and/or a capability of the UE.

In some embodiments, the configuration indicates the UE to measure aperiodic CSI based on aperiodic IMR and/or CMR. When time-frequency resources occupied by the aperiodic IMR and/or CMR are determined to be partially or completely overlapped with time-frequency resources of a PDSCH, the UE may perform a rate matching for the overlapped time-frequency resources when the PDSCH is received by the UE. In various embodiments, the PDSCH is scheduled by at least one of: a DL grant or UL grant that triggers the aperiodic CSI report; another downlink control information (DCI); or a semi-static semi-persistent scheduling (SPS) PDSCH.

The power module 208 can include a power source such as one or more batteries, and a power regulator, to provide regulated power to each of the above-described modules in FIG. 2. In some embodiments, if the BS 200 is coupled to a dedicated external power source (e.g., a wall electrical outlet), the power module 208 can include a transformer and a power regulator.

The various modules discussed above are coupled together by a bus system 230. The bus system 230 can include a data bus and, for example, a power bus, a control signal bus, and/or a status signal bus in addition to the data bus. It is understood that the modules of the BS 200 can be operatively coupled to one another using any suitable techniques and mediums.

Although a number of separate modules or components are illustrated in FIG. 2, persons of ordinary skill in the art will understand that one or more of the modules can be combined or commonly implemented. For example, the processor 204 can implement not only the functionality described above with respect to the processor 204, but also implement the functionality described above with respect to the CSI report configurator 220. Conversely, each of the modules illustrated in FIG. 2 can be implemented using a plurality of separate components or elements.

Figure 3:
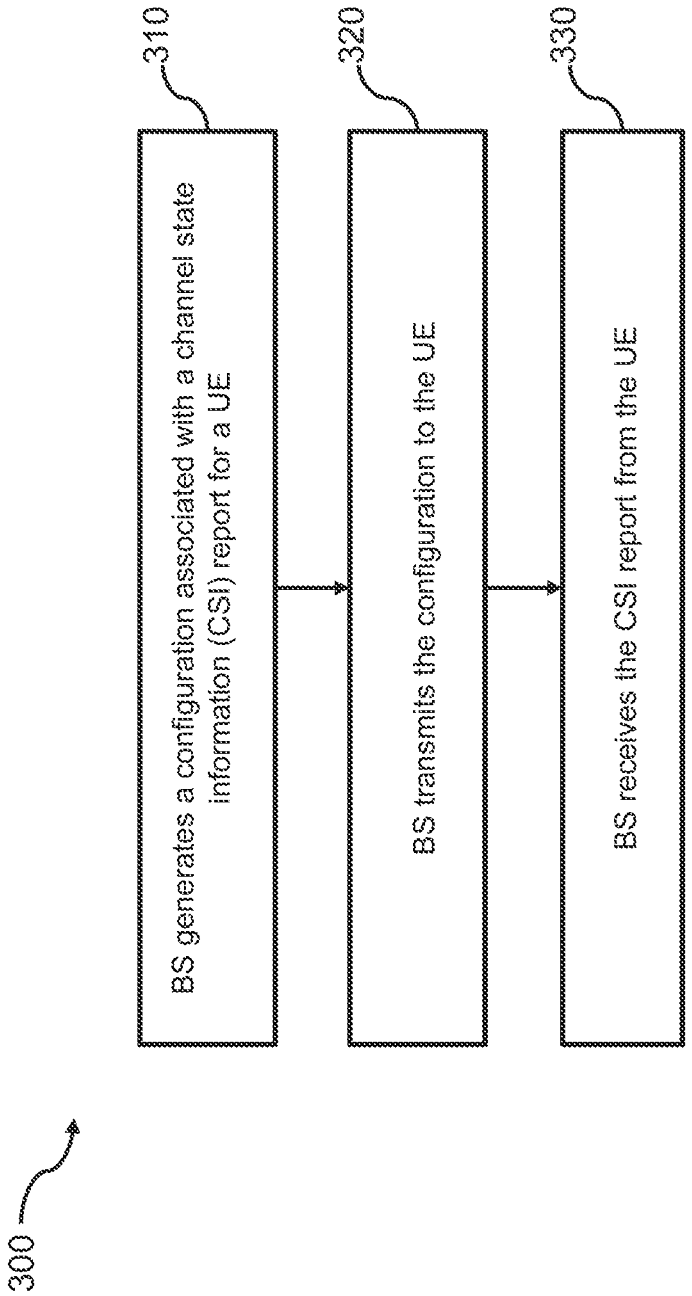
FIG. 3 illustrates a flow chart for a method performed by a BS for CSI measurement and report, in accordance with some embodiments of the present disclosure.

FIG. 3 illustrates a flow chart for a method 300 performed by a BS, e.g. the BS 200 in FIG. 2, for CSI measurement and report, in accordance with some embodiments of the present disclosure. At operation 310, the BS generates a configuration associated with a channel state information (CSI) report for a UE. At operation 320, the BS transmits the configuration to the UE. At operation 330, the BS receives and analyze the CSI report from the UE. The order of the operations shown in FIG. 3 may be changed according to different embodiments of the present disclosure.

Figure 4:
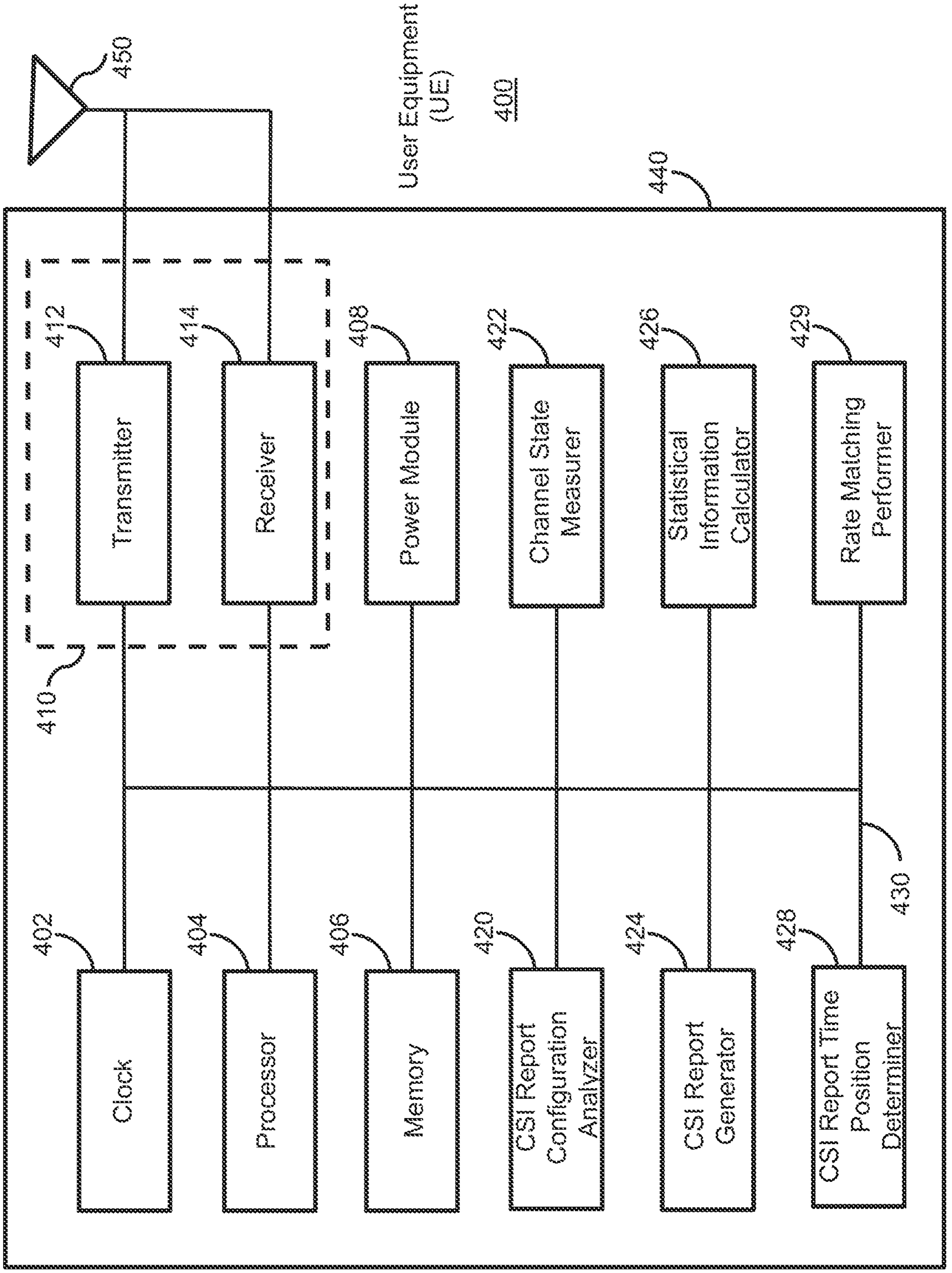
FIG. 4 illustrates a block diagram of a user equipment (UE), in accordance with some embodiments of the present disclosure.

FIG. 4 illustrates a block diagram of a UE 400, in accordance with some embodiments of the present disclosure. The UE 400 is an example of a device that can be configured to implement the various methods described herein. As shown in FIG. 4, the UE 400 includes a housing 440 containing a system clock 402, a processor 404, a memory 406, a transceiver 410 comprising a transmitter 412 and a receiver 414, a power module 408, a CSI report configuration analyzer 420, a channel state measurer 422, a CSI report generator 424, a statistical information calculator 426, a CSI report time position determiner 428, and a rate matching performer 429.

In this embodiment, the system clock 402, the processor 404, the memory 406, the transceiver 410 and the power module 408 work similarly to the system clock 202, the processor 204, the memory 206, the transceiver 210 and the power module 208 in the BS 200. An antenna 450 or a multi-antenna array 450 is typically attached to the housing 440 and electrically coupled to the transceiver 410.

The CSI report configuration analyzer 420 in this example may receive, via the receiver 414 from a BS, a configuration associated with a channel state information (CSI) report. The CSI report configuration analyzer 420 can analyze the configuration to determine a CSI report type based on the configuration. According to the CSI report type, the channel state measurer 422 may perform a measurement based on at least one of: an interference measurement resource (IMR), a channel measurement resource (CMR), or a transport block transmitted in a physical downlink shared channel (PDSCH) from the BS. The CSI report generator 424 in this example can generate the CSI report based on the measurement; and transmit, via the transmitter 412, the CSI report to the BS.

In some embodiments, the CSI report type is determined to be a first type when the configuration contains no configuration information related to IMR or CMR associated with the CSI report. The measurement is performed based on a transport block transmitted in PDSCH associated with the CSI report, when configuration contains no configuration information related to IMR or CMR associated with the CSI report.

In some embodiments, the UE 400 may receive, via the receiver 414, a plurality of PDSCH repetitions associated with the CSI report from the BS; and determine a PDSCH repetition among the plurality of PDSCH repetitions. The CSI report generator 424 can generate the CSI report based on the PDSCH repetition. The PDSCH repetition may be determined based on at least one of: the first time PDSCH repetition among the plurality of PDSCH repetitions based on a system pre-definition, the last time PDSCH repetition among the plurality of PDSCH repetitions based on a system pre-definition, a sub-signaling in the configuration semi-statically received through radio resource control (RRC) signaling, or a triggering status indication dynamically indicated by a downlink (DL) grant or uplink (UL) grant triggering the CSI report.

In some embodiments, after receiving the plurality of PDSCH repetitions associated with the CSI report, the CSI report generator 424 generates the CSI report based on a combination of some or all PDSCH repetitions among the plurality of PDSCH repetitions. The some or all PDSCH repetitions may be determined based on at least one of: some of the plurality of PDSCH repetitions based on a system pre-definition, some of the plurality of PDSCH repetitions indicated by a sub-signaling in the configuration semi-statically received through radio resource control (RRC) signaling, some of the plurality of PDSCH repetitions dynamically indicated in a triggering status indication by a DL grant or UL grant triggering the CSI report, all of the plurality of PDSCH repetitions based on a system pre-definition, all of the plurality of PDSCH repetitions indicated by a sub-signaling in the configuration semi-statically received through RRC signaling, or all of the plurality of PDSCH repetitions dynamically indicated in a triggering status indication by a DL grant or UL grant triggering the CSI report.

In some embodiments, the CSI report type is determined to be a second type when the configuration contains configuration information related to IMR and/or CMR associated with the CSI report. The measurement is performed based on the IMR and/or CMR received from the BS, when the configuration contains configuration information related to IMR and/or CMR associated with the CSI report.

In some embodiments, the channel state measurer 422 may perform the measurement based on at least one of: determining a starting occasion related to IMR and/or CMR associated with the CSI report; determining an ending occasion related to the IMR and/or CMR; and/or measuring CSI based on: the starting occasion, the ending occasion, and each IMR and/or CMR occasion between the starting occasion and the ending occasion.

In some embodiments, the starting occasion is determined based on at least one of: a slot or sub-slot in which a DL grant or UL grant triggering the CSI report is received from the BS; a slot or sub-slot where the DL grant or UL grant is located, when an end symbol of the DL grant or UL grant is not later than a predetermined time position; a next slot or sub-slot where the DL grant or UL grant is located, when the end symbol of the DL grant or UL grant is later than the predetermined time position, wherein the predetermined time position is determined based on a semi-static configuration by the BS or based on a system pre-definition; or a next available slot or sub-slot where the DL grant or UL grant is located, when the end symbol of the DL grant or UL grant is later than the predetermined time position, wherein the predetermined time position is determined based on a semi-static configuration by the BS or based on a system pre-definition. The next available slot or sub-slot may be used for downlink transmissions, and is not necessarily an uplink slot or sub-slot.

In some embodiments, the ending occasion is determined based on a last IMR and/or CMR occasion that is not later than a reference resource of the CSI report triggered by the DL grant or UL grant, according to a time domain configuration of the IMR and/or CMR. The reference resource of the CSI report is determined as n time units before a first orthogonal frequency-division multiplexing (OFDM) symbol of the CSI report. Each of the n time units is one of: an OFDM symbol, a sub-slot or a slot; where n is an integer determined based on: a semi-static configuration by the BS, a system pre-definition, and/or a capability of the UE 400.

In some embodiments, the CSI report configuration analyzer 420 may determine that the configuration indicates to include statistical information of CSI in the CSI report. Based on this determination, the statistical information calculator 426 can calculate the statistical information for the CSI report when the measurement is performed by the channel state measurer 422 under at least one of the following conditions. According to a first condition, the measurement is performed for at least N IMR and/or CMR occasions, wherein N is a positive integer determined based on a semi-static configuration by the BS or based on a system pre-definition. According to a second condition, the measurement is performed within a monitoring window having a length of at least M time units, wherein M is a positive integer determined based on a semi-static configuration by the BS or based on a system pre-definition. Each of the M time units is one of: an OFDM symbol, a sub-slot or a slot.

In some embodiments, after the CSI report configuration analyzer 420 determines that the configuration indicates to include statistical information of CSI in the CSI report, the UE 400 may either generate the CSI report without the statistical information or determine to cancel the CSI report, when the measurement is performed by the channel state measurer 422 without satisfying at least one of the following conditions. According to a first condition, the measurement is performed for at least N IMR and/or CMR occasions, wherein N is a positive integer determined based on a semi-static configuration by the BS or based on a system pre-definition. According to a second condition, the measurement is performed within a monitoring window having a length of at least M time units, wherein M is a positive integer determined based on a semi-static configuration by the BS or based on a system pre-definition. Each of the M time units is one of: an OFDM symbol, a sub-slot or a slot.

The CSI report time position determiner 428 in this example can determine a time position for transmitting the CSI report. In some embodiments, the CSI report time position determiner 428 can determine a first time unit where an ending occasion related to the IMR and/or CMR is located; and determine a time position for transmitting the CSI report to be another first time unit that is later than the first time unit by N second time units. Each first time unit is one of: an OFDM symbol, a sub-slot or a slot; and each second time unit is one of: an OFDM symbol, a sub-slot or a slot, where N is an integer determined based on: a semi-static configuration by the BS, a system pre-definition, and/or a capability of the UE 400. For example, while the ending occasion related to the IMR and/or CMR is located at the second OFDM symbol of a first slot, the time position may be the second OFDM symbol of a third slot, which is later than the second OFDM symbol of the first slot by two slots. The CSI report is then transmitted on a physical uplink control channel (PUCCH) resource at the time position to the BS.

In some embodiments, the CSI report time position determiner 428 can determine an ending position of a monitoring window of the measurement of the IMR and/or CMR; and determine a time position for transmitting the CSI report to be a first time unit that is later than the ending position by N second time units. The first time unit is one of: an OFDM symbol, a sub-slot or a slot; and each second time unit is one of: an OFDM symbol, a sub-slot or a slot, where N is an integer determined based on: a semi-static configuration by the BS, a system pre-definition, and/or a capability of the UE 400. The CSI report is then transmitted on a PUCCH resource at the time position to the BS.

The rate matching performer 429 in this example can perform a rate matching. In some embodiments, after the CSI report configuration analyzer 420 determines that the configuration indicates to measure aperiodic CSI based on aperiodic IMR and/or CMR, the rate matching performer 429 may determine that time-frequency resources occupied by the aperiodic IMR and/or CMR are partially or completely overlapped with time-frequency resources of a PDSCH. In this case, the rate matching performer 429 can perform a rate matching for the overlapped time-frequency resources when receiving the PDSCH via the receiver 414. In various embodiments, the PDSCH is scheduled by at least one of: a DL grant or UL grant that triggers the aperiodic CSI report; another downlink control information (DCI); or a semi-static semi-persistent scheduling (SPS) PDSCH The various modules discussed above are coupled together by a bus system 430. The bus system 430 can include a data bus and, for example, a power bus, a control signal bus, and/or a status signal bus in addition to the data bus. It is understood that the modules of the UE 400 can be operatively coupled to one another using any suitable techniques and mediums.

Although a number of separate modules or components are illustrated in FIG. 4, persons of ordinary skill in the art will understand that one or more of the modules can be combined or commonly implemented. For example, the processor 404 can implement not only the functionality described above with respect to the processor 404, but also implement the functionality described above with respect to the CSI report configuration analyzer 420. Conversely, each of the modules illustrated in FIG. 4 can be implemented using a plurality of separate components or elements.

Figure 5:
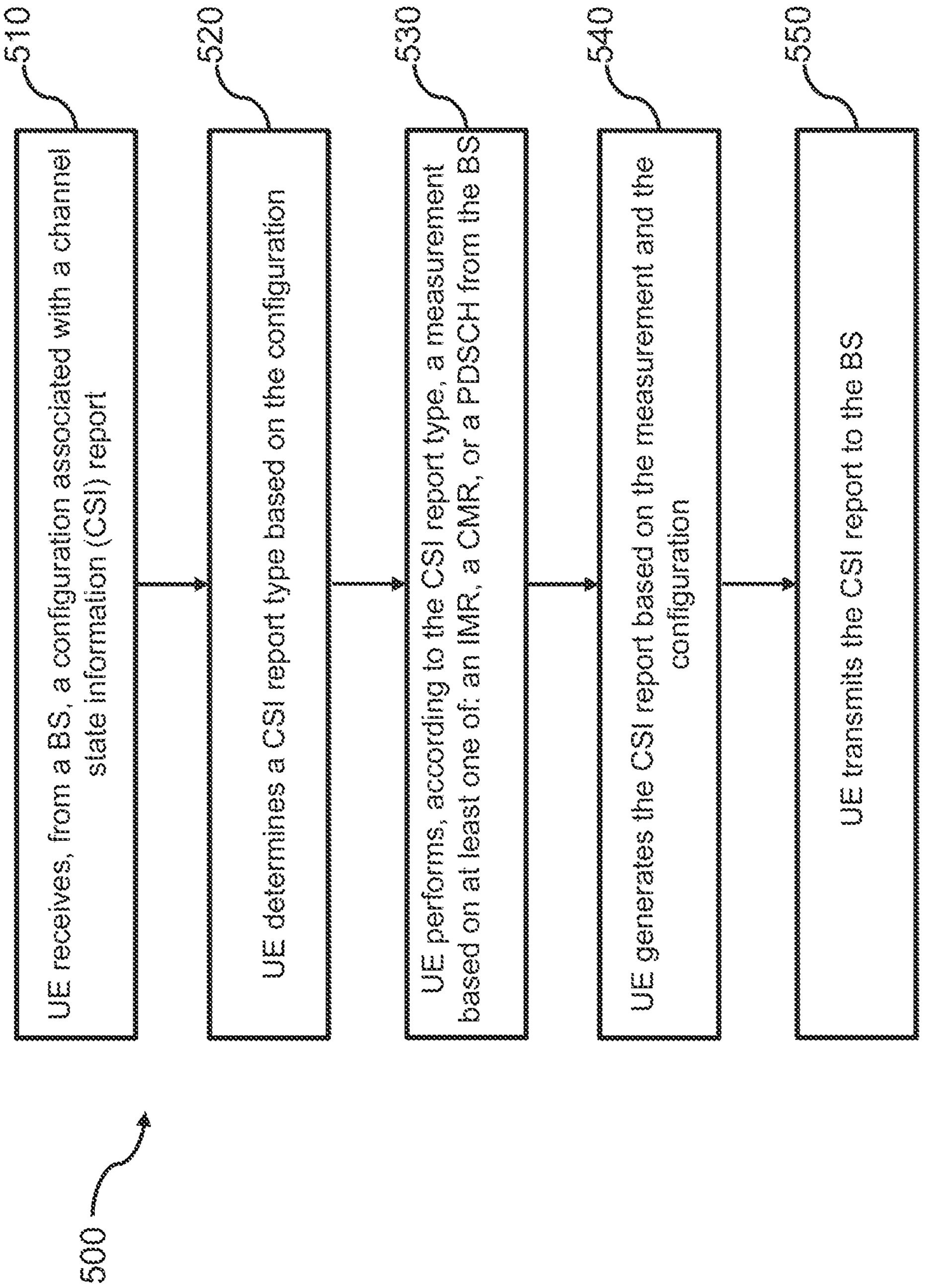
FIG. 5 illustrates a flow chart for a method performed by a UE for CSI measurement and report, in accordance with some embodiments of the present disclosure.

FIG. 5 illustrates a flow chart for a method 500 performed by a UE, e.g. the UE 400 in FIG. 4, for CSI measurement and report, in accordance with some embodiments of the present disclosure. At operation 510, the UE receives, from a BS, a configuration associated with a channel state information (CSI) report. At operation 520, the UE determines a CSI report type based on the configuration. At operation 530, the UE performs, according to the CSI report type, a measurement based on at least one of: an IMR, a CMR, or a PDSCH from the BS. At operation 540, the UE generates the CSI report based on the measurement and the configuration. At operation 550, the UE transmits the CSI report to the BS. The order of the operations shown in FIG. 5 may be changed according to different embodiments of the present disclosure.

Different embodiments of the present disclosure will now be described in detail hereinafter. It is noted that the features of the embodiments and examples in the present disclosure may be combined with each other in any manner without conflict.

A first embodiment describes methods to determine the CSI report should be based on which time of PDSCH repetitions. The CSI report fed back by the UE to the BS supports one or more types. For one of the CSI report types, the UE measures CSI based on PDSCH. For other types of CSI report, the UE measures CSI based on CSI reference signal (CSI-RS) or CSI interference measurement (CSI-IM). The CSI report may be an aperiodic CSI feedback, a semi-persistent CSI feedback or a periodic CSI feedback.

For a PDSCH supporting repetition transmissions, the BS can indicate the UE about the number of times that the PDSCH is transmitted repeatedly, e.g. two, four, or eight times, through a semi-static RRC signaling or a dynamic DCI signaling. When the UE is instructed to measure the CSI based on one or more of the PDSCH repetition transmissions and report the CSI report, at least one of the following methods can be used to instruct the UE to calculate the CSI report based on which time of the PDSCH repetition transmissions.

First, the system can predefine that, among the PDSCH repetition transmissions, the UE always calculates the CSI according to the n-th PDSCH repetition. The n-th repetition may be the first time or the last time of the PDSCH repetition transmissions.

Second, the BS can semi-statically configure that the CSI report is calculated according to the m-th PDSCH repetition, through the RRC signaling. For example, m is one of the M repetition times of the PDSCH, and the PDSCH needs to be transmitted M times by a semi-static or dynamic configuration. The BS can add a sub-signaling in the CSI report configuration carried by the RRC signaling to indicate m, where the CSI report configuration corresponds to a CSI report type or CSI feedback type that is based on PDSCH measurement.

Third, the BS can dynamically indicate the CSI report is calculated according to the x-th PDSCH repetition through the DCI. The BS can send a DL grant or UL grant to trigger the CSI report of the specified feedback type. The "DL grant" or "UL grant" indicates a CSI report triggering status, which includes an indication of the x-th time of PDSCH repetition, so that the UE can calculate the "CSI report" according to the received x-th time of PDSCH repetition.

Fourth, the system can predefine that for the PDSCH that is repeatedly transmitted, the UE calculates the CSI report according to a combination result of some or all of the PDSCH repetitions.

Fifth, the BS can semi-statically configure that whether the UE calculates the CSI report according to the combination result of some or all of the PDSCH repetitions, through the RRC signaling. The BS can add a sub-signaling in the CSI report configuration carried by the RRC signaling to indicate this. If the sub-signaling indicates yes, the UE needs to calculate and feed back the CSI report according to the combined result of some or all of the PDSCH repetitions. If the sub-signaling indicates no, the UE calculates and feeds back the CSI report according to one repetition of the received PDSCHs.

Sixth, the BS can dynamically indicate that whether the UE calculates the CSI report according to the combination result of some or all of the PDSCH repetitions. For example, the BS sends a DL grant or UL grant to trigger the CSI report of the specified type. The DL grant or UL grant indicates a CSI report triggering status, which includes the indication. If the CSI report triggering status indicates yes, the UE needs to calculate and feed back the CSI report according to the combined result of some or all of the repeated PDSCH transmissions. If the CSI report triggering status indicates no, the UE calculates and feeds back the CSI report according to one repetition of the received PDSCHs.

A second embodiment describes methods to determine the starting CSI-RS occasion and ending CSI-RS occasion triggered by DL grant or UL grant. After the BS sends a DL grant or UL grant to trigger CSI report, the UE sends back the CSI report to the BS. The CSI report may contain some statistical information of the channel state. The UE measures the interference information used for calculating the CSI report according to the IMR; and/or measures the channel information used for calculating the CSI report according to the CMR. While sending DL grant or UL grant to trigger the CSI feedback, the BS also triggers the corresponding IMR and/or CMR. The UE needs to measure the CSI according to several IMR occasions and/or CMR occasions, to generate the CSI report.

At least one of the following methods can be used to determine the first IMR occasion or CMR occasion. In one method, the slot or sub-slot, in which the DL grant or UL grant triggering the CSI report is received by the UE, is the first occasion for the UE to receive the IMR and/or CMR, for measurement of the CSI. In another method, if the end symbol of the DL grant or UL grant, received by the UE for triggering the CSI report, is not later than a time position A, the UE will receive the first occasion of the IMR and/or CMR on the slot or sub-slot where the DL grant or UL grant is located. Otherwise, the UE will receive the first occasion of the IMR and/or CMR on the next available slot or sub-slot where the DL grant or UL grant is located. The next available slot or sub-slot may be the next slot or sub-slot. The next available slot or sub-slot may be used for downlink transmissions, and may not necessarily be an uplink slot or sub-slot. The time position A may be pre-defined by the system or semi-statically configured by the BS, which can be an OFDM symbol index within one slot or sub-slot.

The ending or last occasion among several IMR or CMR occasions can be determined as follows. The UE determines the ending occasion of the received IMR and/or CMR according to the reference resource of the CSI report triggered by the DL grant or UL grant. The reference resource of the CSI report may be determined as n time units before the first OFDM symbol of transmitting the CSI report fed back by the UE. The time units may be OFDM symbols, sub-slots or slots. The n is an integer pre-defined by the system or determined based on a semi-static configuration of the BS and/or the UE capability. According to the time domain configuration of the IMR and/or CMR, the last IMR and/or CMR occasion not later than the reference resource of the CSI report is the ending occasion of the IMR and/or CMR received by the UE for measurement.

After the UE determines the first IMR and/or CMR occasion to be measured and the last IMR and/or CMR occasion to be measured, the UE needs receive and measure all IMR and/or CMR occasions from the first occasion to the last occasion. The CMR may be a periodic CSI-RS resource or semi-persistent CSI-RS resource. The IMR may be a periodic CSI-RS resource, a semi-persistent CSI-RS resource, a periodic CSI-IM resource or a semi-persistent CSI-IM resource.

A third embodiment describes a relationship between the CSI report quantity and the IMR and/or CMR. The BS configures the CSI report through RRC signaling, to determine what information should be included in the CSI report. The specific feedback quantity contained in the CSI report can be configured through the RRC signaling—report quantity or another RRC signaling. For type 1 CSI report, the feedback information contained in the CSI report does not include the quantities reflecting the statistical information of channel status information, such as the mean value, the variance value and so on. For type 2 CSI report, the feedback information contained in the CSI report includes the statistical information of channel status information, such as the mean value, the variance value and so on. For type 2 CSI report, the UE needs to measure the IMR and/or CMR for a period of time to obtain the statistical information for the CSI report. For type 1 CSI report, there is no such constraint on UE's measurement.

If the BS configures the CSI report including the type 2 CSI report through RRC signaling, the UE measurement should meet at least one of the following conditions. First, the UE needs to measure at least n IMR and/or CMR occasions to calculate and feed back the CSI report. The n is predefined by the system or configured semi-statically by the BS. The n IMR and/or CMR occasions may be n occasions that are arranged in order or out of order. Second, the UE can calculate and feed back the CSI report, only after measuring for a length of a monitoring window having at least m time units. The m is pre-defined by the system or configured semi-statically by the BS. The time unit is an OFDM symbol, sub-slot or slot. The m time units may be continuous or non-continuous in time domain.

If the UE's measurement does not meet at least one of the above conditions, the UE uses one of the following methods for CSI report: the UE gives up feeding back this CSI report; or the UE degrades this type 2 CSI report to be type 1 CSI report, and feeds back the type 1 CSI report.

A fourth embodiment describes how to determine the PUCCH resource(s) for carrying a CSI report. After the BS sends a DL grant or UL grant to trigger CSI report, the UE sends back the CSI report to the BS. For example, the BS indicates a trigger state in the DL grant or UL grant to indicate how the UE should transmit the CSI report. In the trigger state, DL grant or UL grant, the BS can indicate the number of IMR and/or CMR measurement occasions corresponding to the CSI report, or indicate a monitoring window length of the IMR and/or CMR measurement corresponding to the CSI report.

According to the IMR and/or CMR measurement occasion number indicated by the BS, or the IMR and/or CMR measurement's monitoring window length, the UE can determine a time position for transmitting a PUCCH resource carrying the CSI report, based on at least one of the following methods.

In a first method, the BS indicates to the UE that the number of IMR and/or CMR occasions corresponding to the CSI report is K. After the CSI report is triggered by the BS, the UE measures for consecutive K IMR and/or CMR occasions. The UE determines an ending first time unit of the last occasion of the K IMR and/or CMR occasions. The UE determines a second time unit that is N second time units later than the first time unit, where N is pre-defined by the system, semi-statically configured by the BS, or determined based on the UE capability. The UE sends the PUCCH resource carrying the CSI report at the determined second time unit. Each first time unit is an OFDM symbol, sub-slot or slot. Each second time unit is an OFDM symbol, sub-slot or slot.

In a second method, the BS indicates to the UE that the IMR and/or CMR measurement's monitoring window length corresponding to the CSI report is b third time units. After the CSI report is triggered by the BS, the UE measures CSI on consecutive or continuous b third time units. The UE determines a first time unit that is N second time units later than an ending position of the b third time units of the monitoring window. The UE sends the PUCCH resource carrying the CSI report at the determined first time unit. Each first time unit is an OFDM symbol, sub-slot or slot. Each second time unit is an OFDM symbol, sub-slot or slot. Each third time unit is an OFDM symbol, sub-slot or slot.

The N is pre-defined by the system, semi-statically configured by the BS, or determined based on the UE capability. The UE sends the PUCCH resource carrying the CSI report at the determined first time unit to feed back the CSI report to the BS.

A fifth embodiment describes when to perform PDSCH rate matching around IMR/CMR. The BS may trigger the UE to feed back an aperiodic CSI through DL grant or UL grant. The aperiodic CSI is measured based on the aperiodic IMR and/or CMR. If the time-frequency resources occupied by the aperiodic IMR and/or CMR are partially or completely overlapped with the time-frequency resources of a PDSCH sent by the BS to the UE, rate matching may be performed for the overlapped resources when the UE receives the PDSCH. The PDSCH can be scheduled by the DL grant that triggers the aperiodic CSI, by other DCI, or by a semi-static SPS PDSCH.

A sixth embodiment describes how to determine which type of CSI report was triggered for a UE. The CSI report sent by the UE to the BS may be either of a first type or of a second type. The first type CSI report and the second type CSI report may have different feedback contents and/or be used for measuring CSI of different downlink channels or signals. The first type CSI report contains CSI obtained based on PDSCH reception. The second type CSI report contains CSI obtained based on IMR and/or CMR reception. The CMR may be a CSI-RS resource, and the IMR may be a CSI-RS resource or CSI-IM resource.

The BS configures at least one CSI report configuration for the UE through RRC signaling. Each CSI report configuration corresponds to either a first type CSI report or a second type CSI report. The UE determines whether the CSI report is of the first type or the second type according to the following method. The UE first determines whether the CSI report configuration associated with the triggered CSI report contains an IMR and/or CMR configuration. If the CSI report configuration contains the IMR and/or CMR configuration, the UE determines that the CSI report is of the first type. Otherwise, the UE determines that the CSI report is of the second type.

After the UE determines the type of the CSI report, the UE measures CSI accordingly. If the UE determines that the CSI report is of the first type, the UE measures the signals based on the PDSCH reception and feeds back the corresponding CSI report to the BS. If the UE determines that the CSI report is of the second type, the UE measures the signals based on the IMR and/or CMR associated with the CSI report, and feeds back the corresponding CSI report to the BS.

While various embodiments of the present disclosure have been described above, it should be understood that they have been presented by way of example only, and not by way of limitation. Likewise, the various diagrams may depict an example architectural or configuration, which are provided to enable persons of ordinary skill in the art to understand exemplary features and functions of the present disclosure. Such persons would understand, however, that the present disclosure is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described exemplary embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques.

To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure. In accordance with various embodiments, a processor, device, component, circuit, structure, machine, module, etc. can be configured to perform one or more of the functions described herein. The term "configured to" or "configured for" as used herein with respect to a specified operation or function refers to a processor, device, component, circuit, structure, machine, module, etc. that is physically constructed, programmed and/or arranged to perform the specified operation or function.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the present disclosure.

Additionally, memory or other storage, as well as communication components, may be employed in embodiments of the present disclosure. It will be appreciated that, for clarity purposes, the above description has described embodiments of the present disclosure with reference to different functional units and processors. However, it will be apparent that any suitable distribution of functionality between different functional units, processing logic elements or domains may be used without detracting from the present disclosure. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

The invention claimed is:

1. A method performed by a wireless communication device, the method comprising:

receiving, from a wireless communication node, a configuration associated with a channel state information (CSI) report;

determining a CSI report type based on the configuration;

performing, according to the CSI report type, a measurement based on at least one of: an interference measurement resource (IMR) or a channel measurement resource (CMR) from the wireless communication node, wherein the performing the measurement comprises determining a starting occasion related to IMR and/or CMR associated with the CSI report;

determining an ending occasion related to the IMR and/or CMR based on a last IMR and/or CMR occasion that is not later than a reference resource of the CSI report triggered by the DL grant or UL grant, according to a time domain configuration of the IMR and/or CMR; and measuring CSI based on: the starting occasion, the ending occasion, and each IMR and/or CMR occasion between the starting occasion and the ending occasion;

generating the CSI report based on the measurement; and transmitting the CSI report to the wireless communication node.

2. The method of claim 1, wherein:

the CSI report type is determined to be a first type when the configuration contains no configuration information related to IMR or CMR associated with the CSI report; and the measurement is performed based on a transport block transmitted in physical downlink shared channel (PDSCH) associated with the CSI report.

3. The method of claim 1, further comprising:

receiving a plurality of PDSCH repetitions associated with the CSI report from the wireless communication node; and determining a PDSCH repetition among the plurality of PDSCH repetitions, wherein the CSI report is generated based on the PDSCH repetition, wherein the PDSCH repetition is determined based on at least one of:

the first time PDSCH repetition among the plurality of PDSCH repetitions based on a system pre-definition, the last time PDSCH repetition among the plurality of PDSCH repetitions based on a system pre-definition, a sub-signaling in the configuration semi-statically received through radio resource control (RRC) signaling, or a triggering status indication dynamically indicated by a downlink (DL) grant or uplink (UL) grant triggering the CSI report.

4. The method of claim 1, further comprising:

receiving a plurality of PDSCH repetitions associated with the CSI report from the wireless communication node; and determining at least some PDSCH repetitions among the plurality of PDSCH repetitions, wherein the CSI report is generated based on a combination of the at least some PDSCH repetitions, wherein the at least some PDSCH repetitions are determined based on at least one of:

some of the plurality of PDSCH repetitions based on a system pre-definition, some of the plurality of PDSCH repetitions indicated by a sub-signaling in the configuration semi-statically received through radio resource control (RRC) signaling, some of the plurality of PDSCH repetitions dynamically indicated in a triggering status indication by a DL grant or UL grant triggering the CSI report, all of the plurality of PDSCH repetitions based on a system pre-definition, all of the plurality of PDSCH repetitions indicated by a sub-signaling m the configuration semi-statically received through RRC signaling, or all of the plurality of PDSCH repetitions dynamically indicated in a triggering status indication by a DL grant or UL grant triggering the CSI report.

5. The method of claim 1, wherein:
the CSI report type is determined to be a second type when the configuration contains configuration information related to IMR and/or CMR associated with the CSI report; and
the measurement is performed based on the IMR and/or CMR received from the wireless communication node.
6. The method of claim 5, further comprising:
determining that the configuration indicates to include statistical information of CSI in the CSI report; and
calculating the statistical information for the CSI report when the measurement is performed under at least one of the following conditions:
the measurement is performed for at least N IMR and/or CMR occasions, wherein N is a positive integer determined based on a semi-static configuration by the wireless communication node or based on a system pre-definition, or
the measurement is performed within a monitoring window having a length of at least M time units, wherein M is a positive integer determined based on a semi-static configuration by the wireless communication node or based on a system pre-definition, wherein each of the M time units is one of: an OFDM symbol, a sub-slot or a slot.
7. The method of claim 5, further comprising:
determining that the configuration indicates to include statistical information of CSI in the CSI report; and
determining to generate the CSI report without the statistical information or cancel the CSI report, when the measurement is performed without satisfying at least one of the following conditions:
the measurement is performed for at least N IMR and/or CMR occasions, wherein N is a positive integer determined based on a semi-static configuration by the wireless communication node or based on a system pre-definition, or
the measurement is performed within a monitoring window having a length of at least M time units, wherein M is a positive integer determined based on a semi-static configuration by the wireless communication node or based on a system pre-definition, wherein each of the M time units is one of: an OFDM symbol, a sub-slot or a slot.
8. The method of claim 5, further comprising:
determining a first time unit where an ending occasion related to the IMR and/or CMR is located; and
determining a time position to be another first time unit that is later than the first time unit by N second time units, wherein
each first time unit is one of: an OFDM symbol, a sub-slot or a slot,
each second time unit is one of: an OFDM symbol, a sub-slot or a slot,
N is an integer determined based on: a semi-static configuration by the wireless communication node, a system pre-definition, and/or a capability of the wireless communication device, and
the CSI report is transmitted on a physical uplink control channel (PUCCH) resource at the time position to the wireless communication node.
9. The method of claim 5, further comprising:
determining an ending position of a monitoring window of the measurement of the IMR and/or CMR; and
determining a time position to be a first time unit that is later than the ending position by N second time units, wherein
the first time unit is one of: an OFDM symbol, a sub-slot or a slot,
each second time unit is one of: an OFDM symbol, a sub-slot or a slot,
N is an integer determined based on: a semi-static configuration by the wireless communication node, a system pre-definition, and/or a capability of the wireless communication device, and
the CSI report is transmitted on a physical uplink control channel (PUCCH) resource at the time position to the wireless communication node.
10. The method of claim 5, further comprising:
determining that the configuration indicates to measure aperiodic CSI based on aperiodic IMR and/or CMR;
determining that time-frequency resources occupied by the aperiodic IMR and/or CMR are partially or completely overlapped with time-frequency resources of a PDSCH;
performing a rate matching for the overlapped time-frequency resources when receiving the PDSCH.
11. The method of claim 1, wherein the starting occasion is determined based on at least one of:
a slot or sub-slot in which a DL grant or UL grant triggering the CSI report is received from the wireless communication node;
a slot or sub-slot where the DL grant or UL grant is located, when an end symbol of the DL grant or UL grant is not later than a predetermined time position;
a next slot or sub-slot where the DL grant or UL grant is located, when the end symbol of the DL grant or UL grant is later than the predetermined time position, wherein the predetermined time position is determined based on a semi-static configuration by the wireless communication node or based on a system pre-definition; or
a next available slot or sub-slot where the DL grant or UL grant is located, when the end symbol of the DL grant or UL grant is later than the predetermined time position, wherein the predetermined time position is determined based on a semi-static configuration by the wireless communication node or based on a system pre-definition.
12. The method of claim 1, wherein:
the reference resource of the CSI report is determined as n time units before a first orthogonal frequency-division multiplexing (OFDM) symbol of transmitting the CSI report;
each of the n time units is one of: an OFDM symbol, a sub-slot or a slot; and
n is an integer determined based on: a semi-static configuration by the wireless communication node, a system pre-definition, and/or a capability of the wireless communication device.
13. A method performed by a wireless communication node, the method comprising:
transmitting, to a wireless communication device, a configuration associated with a channel state information (CSI) report, wherein
the configuration indicates a CSI report type, and
the CSI report is generated based on a measurement that is performed according to the CSI report type based on at least one of:
an interference measurement resource (IMR) or a channel measurement resource (CMR) from the wireless communication node, the measurement is performed by:

determining a starting occasion related to IMR and/or CMR associated with the CSI report;

determining an ending occasion related to the IMR and/or CMR based on a last IMR and/or CMR occasion that is not later than a reference resource of the CSI report triggered by the DL grant or UL grant, according to a time domain configuration of the IMR and/or CMR; and measuring CSI based on: the starting occasion, the ending occasion, and each IMR and/or CMR occasion between the starting occasion and the ending occasion; and receiving the CSI report from the wireless communication device.

14. The method of claim 13, wherein:

the CSI report type indicates a first type when the configuration contains no configuration information related to IMR or CMR associated with the CSI report; and the measurement is performed based on a transport block transmitted m physical downlink shared channel (PDSCH) associated with the CSI report.

15. The method of claim 13, further comprising:

transmitting a plurality of PDSCH repetitions associated with the CSI report to the wireless communication device, wherein the CSI report is generated based on a PDSCH repetition among the plurality of PDSCH repetitions, wherein the PDSCH repetition is determined based on at least one of:

the first time PDSCH repetition among the plurality of PDSCH repetitions based on a system pre-definition, the last time PDSCH repetition among the plurality of PDSCH repetitions based on a system pre-definition, a sub-signaling in the configuration semi-statically transmitted through radio resource control (RRC) signaling, or a triggering status indication dynamically indicated by a downlink (DL) grant or uplink (UL) grant triggering the CSI report.

16. The method of claim 13, further comprising:

transmitting a plurality of PDSCH repetitions associated with the CSI report to the wireless communication device, wherein the CSI report is generated based on a combination of at least some PDSCH repetitions among the plurality of PDSCH repetitions, wherein the at least some PDSCH repetitions are determined based on at least one of:

some of the plurality of PDSCH repetitions based on a system pre-definition, some of the plurality of PDSCH repetitions indicated by a sub-signaling in the configuration semi-statically transmitted through radio resource control (RRC) signaling, some of the plurality of PDSCH repetitions dynamically indicated in a triggering status indication by a DL grant or UL grant triggering the CSI report, all of the plurality of PDSCH repetitions based on a system pre-definition, all of the plurality of PDSCH repetitions indicated by a sub-signaling m the configuration semi-statically transmitted through RRC signaling, or all of the plurality of PDSCH repetitions dynamically indicated in a triggering status indication by a DL grant or UL grant triggering the CSI report.

17. The method of claim 13, wherein:

the CSI report type indicates a second type when the configuration contains configuration information related to IMR and/or CMR associated with the CSI report; and the measurement is performed based on the IMR and/or CMR transmitted to the wireless communication device.

18. The method of claim 13, wherein the starting occasion is determined based on at least one of:

a slot or sub-slot in which a DL grant or UL grant triggering the CSI report is transmitted to the wireless communication device;

a slot or sub-slot where the DL grant or UL grant is located, when an end symbol of the DL grant or UL grant is not later than a predetermined time position;

a next slot or sub-slot where the DL grant or UL grant is located, when the end symbol of the DL grant or UL grant is later than the predetermined time position, wherein the predetermined time position is determined based on a semi-static configuration by the wireless communication node or based on a system pre-definition; or a next available slot or sub-slot where the DL grant or UL grant is located, when the end symbol of the DL grant or UL grant is later than the predetermined time position, wherein the predetermined time position is determined based on a semi-static configuration by the wireless communication node or based on a system pre-definition.

* * * * *